US008166179B2

(12) United States Patent
Pickens et al.

(10) Patent No.: US 8,166,179 B2
(45) Date of Patent: Apr. 24, 2012

(54) MEDIA STREAMING THROUGH A NETWORK ADDRESS TRANSLATION (NAT) DEVICE

(75) Inventors: John Pickens, Newark, CA (US); Hoi-Tauw Jozef Chou, San Ramon, CA (US); Joshua B. Gahm, Newtonville, MA (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 12/362,813

(22) Filed: Jan. 30, 2009

(65) Prior Publication Data
US 2010/0198979 A1    Aug. 5, 2010

(51) Int. Cl.
*G06F 15/16* (2006.01)
(52) U.S. Cl. ....................................... 709/227; 709/231
(58) Field of Classification Search .................. 709/227, 709/231
See application file for complete search history.

(56) References Cited

U.S. PATENT DOCUMENTS

| 7,139,840 | B1 | 11/2006 | O'Toole | |
|---|---|---|---|---|
| 7,953,883 | B2 * | 5/2011 | Thomas et al. | 709/231 |
| 2003/0048780 | A1 * | 3/2003 | Phomsopha | 370/389 |
| 2003/0074453 | A1 * | 4/2003 | Ikonen | 709/228 |
| 2003/0126196 | A1 * | 7/2003 | Lagimonier et al. | 709/203 |
| 2003/0142625 | A1 * | 7/2003 | Wan et al. | 370/235 |
| 2005/0117605 | A1 | 6/2005 | Yan et al. | |
| 2006/0248213 | A1 * | 11/2006 | Sherer et al. | 709/231 |
| 2007/0189311 | A1 | 8/2007 | Kim et al. | |
| 2007/0217407 | A1 | 9/2007 | Yuan et al. | |
| 2008/0062990 | A1 * | 3/2008 | Oran | 370/392 |
| 2009/0024762 | A1 * | 1/2009 | Ganesan | 709/245 |

OTHER PUBLICATIONS

Cisco Technology, Inc., International Search Report, Apr. 15, 2010, p. 1-4.
Cisco Technology, Inc., Written Opinion of the International Searching Authority, Apr. 15, 2010, p. 1-8.
M. Westerlund Ericsson, The Evaluation of Different NAT traversal Techniques for media controlled by Real-time Streaming Protocol (RTSP), Internet-Draft, Jul. 11, 2008, p. 1-37 . vol. mmusic, No. 1.
H. Schulzrinne, A. Rao, R. Lanphier, Real Time Streaming Protcol, IETF Standard, Internet Engineering Task Force, IETF, Standard Working Draft, Internet Society, Apr. 1, 1998, p. 1-89.
Om P. Damani, P. Emerald, Chung, Yennun Huang, Chandra Kintala, Yi-Min Wang, One-IP: techniques for hosting a service on a cluster of machines, Computer Networks and ISDN Systems, Sep. 1, 1997, p. 1019-1027.

* cited by examiner

*Primary Examiner* — Joseph Avellino
*Assistant Examiner* — Jeong S Park
(74) *Attorney, Agent, or Firm* — Merchant & Gould (57) ABSTRACT

A method and system for managing media streaming between clients on a client side of a network and stream servers on a stream server side of the network, wherein communications between the client side and the stream server side require a network address translation (NAT), involves allowing the same stream server side IP address to be shared amongst multiple stream servers so that the stream servers can simultaneously use the same IP address to source different media sessions. Because the stream servers can simultaneously use the same IP address to source different media sessions, a media session can be switched from one stream server to a different stream server without triggering STUN signaling or a change in the NAT mapping.

19 Claims, 9 Drawing Sheets

| Media Session ID | Stream Server Side IP Address | Stream Server Side Port No. | Sourcing Stream Server |
|---|---|---|---|
| 99 | IP1 | A | SS1 |
| 100 | IP1 | B | SS2 |
| 102 | IP1 | C | SS1 |
| 103 | IP1 | D | SS3 |
| 110 | IP5 | A | SS1 |
| 111 | IP5 | B | SS3 |
| 118 | IP6 | F | SS3 |

Aggregated Knowledge (130)

FIG.4A

| Media Session ID | Stream Server Side IP Address | Stream Server Side Port No. | Sourcing Stream Server |
|---|---|---|---|
| 99 | IP1 | A | SS3 |
| 100 | IP1 | B | SS2 |
| 102 | IP1 | C | SS1 |
| 103 | IP1 | D | SS3 |
| 110 | IP5 | A | SS1 |
| 111 | IP5 | B | SS3 |
| 118 | IP6 | F | SS3 |

Aggregated Knowledge (130)

MEDIA STREAMING THROUGH A NETWORK ADDRESS TRANSLATION (NAT) DEVICE

TECHNICAL FIELD

The present disclosure relates generally to digital media networks, and more particularly, to techniques for efficiently streaming digital media through a network address translation (NAT) enabled device.

BACKGROUND

Digital video content is streamed to clients in real-time over traditional cable television and telephone networks, both of which are being leveraged by service providers to provide more attractive and varied services to customers. Because unique Internet Protocol (IP) addresses are a limited resource, clients that receive streamed digital video content are often located behind a NAT device. A NAT device remaps IP addresses, typically between private and public address spaces, so that multiple IP addresses in a private address space can be accessed via a single IP address that is part of the public IP address space.

The real-time streaming of digital video content from a stream server to a client often uses the User Datagram Protocol (UDP) at the Transport Layer (i.e., Layer 4) of the Open Systems Interconnection (OSI) model as defined by the International Organization for Standardization (ISO) and the Internet Engineering Task Force (IETF). Additionally, a protocol referred to as Simple Traversal of UDP through network address translators (STUN) has been developed to enable the discovery of remapped IP addresses and port numbers and also to enable traversal of inbound UDP traffic (e.g., from a stream server to a client) across a NAT device. The STUN protocol utilizes various messages to establish state information that enables UDP traffic to successfully traverse a NAT device. In addition, other control protocols such as Real Time Streaming Protocol (RTSP) are used to convey new parameters between a server and a client in order to enable real-time streaming. In video streaming applications, it may be desirable or necessary to switch the source of a video stream from one stream server to another stream server. In conventional systems, switching a video stream from one stream server to another stream server triggers a change in the state information generated from the STUN protocol and additional RTSP notifications, which can be a resource intensive operation.

SUMMARY

A method for managing media streaming between clients on a client side of a network and stream servers on a stream server side of the network, wherein communications between the client side and the stream server side require a network address translation (NAT), involves allowing the same stream server side IP address to be shared amongst multiple stream servers so that the stream servers can simultaneously use the same IP address to source different media sessions. Because the stream servers can simultaneously use the same IP address to source different media sessions, a media session can be switched from one stream server to a different stream server without triggering STUN signaling or a change in the NAT mapping.

In an embodiment, knowledge of the mapping of the established media sessions is aggregated so that the source stream server of each active media session within a stream server group is known. The aggregated knowledge is then used to ensure that the intended purpose of each upstream message is fulfilled. For example, the aggregated knowledge is used to ensure that an upstream message is provided to the stream server that is sourcing the media session regardless of which stream server receives the message.

In another embodiment, a stream server that is sourcing a media session embeds a feedback IP address, which is specific to the stream server, into a message that is sent downstream to a client. The client extracts the feedback IP address from the message and uses the feedback IP address as the destination IP address for subsequent Real-time Control Protocol (RTCP) messages that are sent upstream from the client to the stream server. Because the destination IP address is unique to the stream server that is sourcing the media session, the upstream RTCP packets are routed directly to the corresponding stream server.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DESCRIPTION OF EXAMPLE EMBODIMENTS

Figure 1:
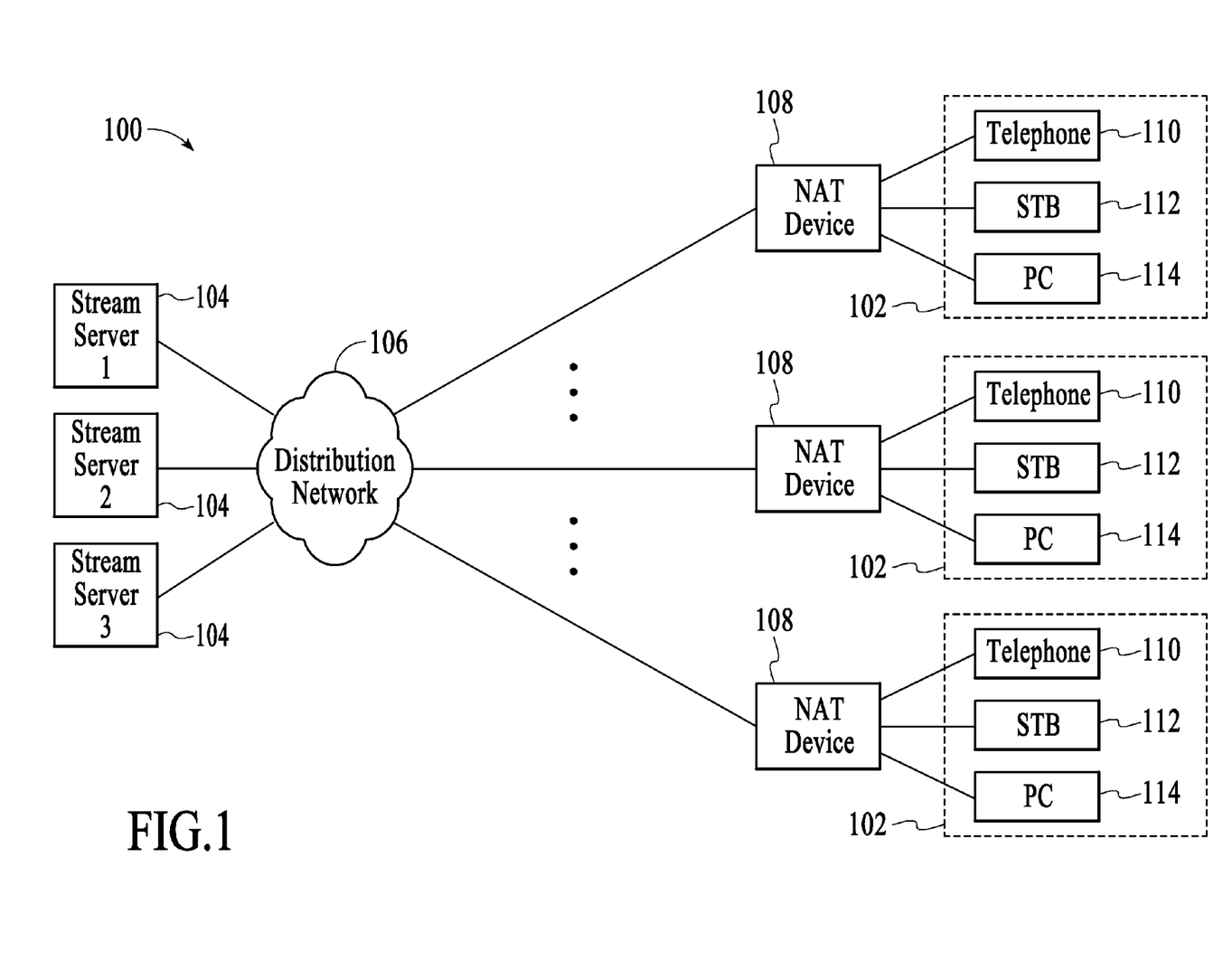
FIG. 1 depicts an embodiment of a system for streaming digital media to multiple different end-user locations.

FIG. 1 depicts an embodiment of a system 100 for streaming digital media to multiple different end-user locations 102.

The system includes stream servers 104, a distribution network 106, NAT devices 108, and various end-user devices, such as telephones 110, set-top-boxes (STBs) 112, and personal computers 114, commonly referred to as "clients." In the embodiment of FIG. 1, the system is able to provide streaming digital video content from any one of the stream servers to any one of the end-user devices. As an example, digital video content is streamed downstream from the stream servers to the STBs using Motion Picture Expert Group (MPEG)-2 Transport Stream (TS) over UDP/IP or Real-time Transport (RTP)/UDP/IP.

Figure 2A:
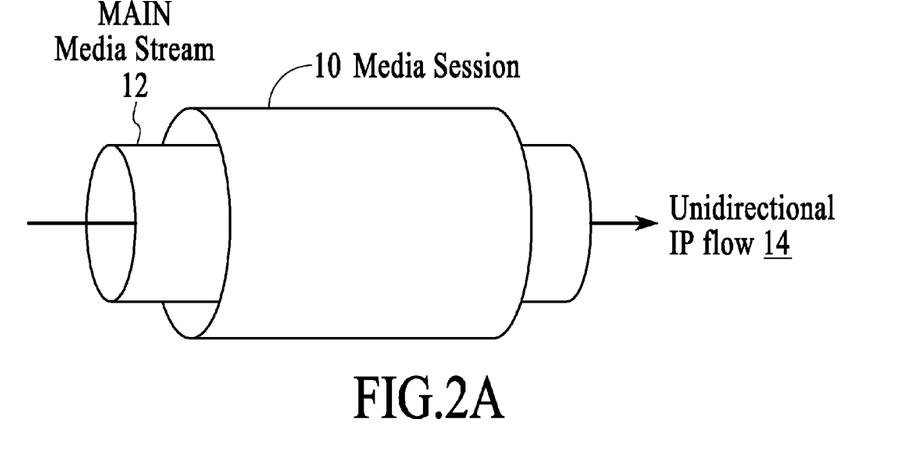
FIG. 2A is a logical illustration of a media session composed of one media stream, which is composed of only one unidirectional IP flow.
Figure 2B:
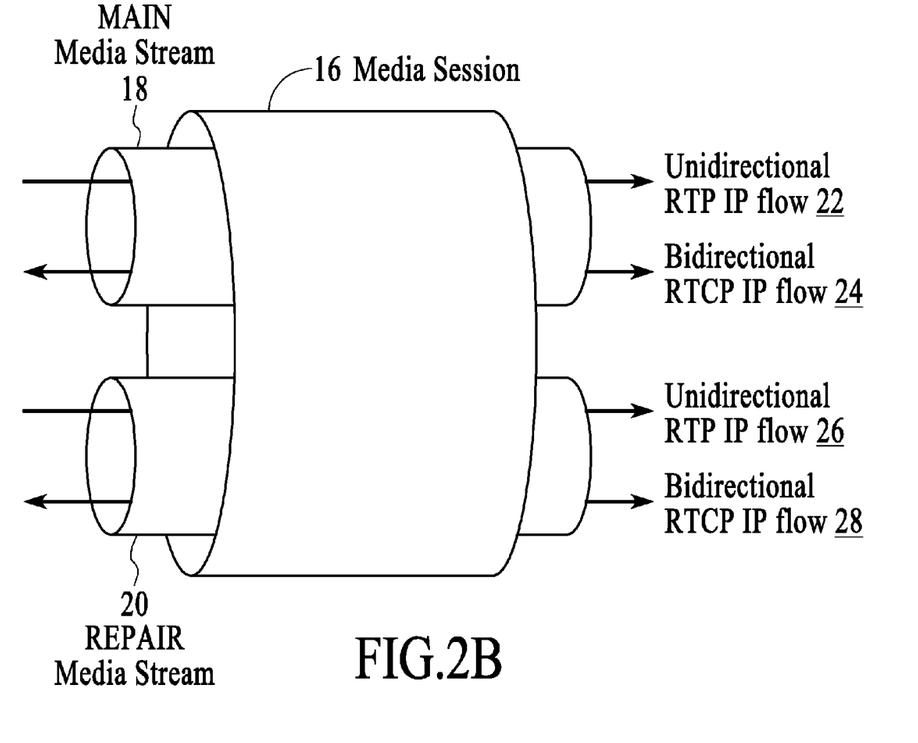
FIG. 2B is a logical illustration of a media session composed of two media streams, a MAIN media stream and a REPAIR media stream, where the MAIN media stream has a unidirectional server-to-client RTP IP flow and a bidirectional RTCP IP flow and the REPAIR stream has a unidirectional server-to-client RTP IP flow and a bidirectional RTCP IP flow.

In an embodiment, a media session is composed of one or more media streams and a media stream is composed of one or more IP flows, where an IP flow is defined by traffic that flows between a particular source IP address and Transport Layer port number (referred to herein simply as the "port number") and a particular destination IP address and destination port number. In the case of MPEG-2 TS UDP, there is only one media stream, which is composed of only one IP flow, a unidirectional server-to-client IP flow. FIG. 2A is a logical illustration of a media session 10, composed of one media stream 12, which is composed of only one unidirectional IP flow 14. In the case of MPEG-2 TS RTP, there can be more than one media stream, with each media stream having one or more IP flows. In one embodiment of an MPEG-2 TS RTP implementation, there are two media streams, a MAIN media stream and a REPAIR media stream. The MAIN media stream has a unidirectional server-to-client RTP IP flow and a bidirectional RTCP IP flow and the REPAIR stream has a unidirectional server-to-client RTP IP flow and a bidirectional RTCP IP flow. FIG. 2B is a logical illustration of a media session 16 composed of two media streams, a MAIN media stream 18 and a REPAIR media stream 20. The MAIN media stream has a unidirectional server-to-client RTP IP flow 22 and a bidirectional RTCP IP flow 24 and the REPAIR stream has a unidirectional server-to-client RTP IP flow 26 and a bidirectional RTCP IP flow 28. Additional media streams of a media session include, for example, a Forward Error Correction (FEC) media stream and/or multiple scalable video codec (SVC) media streams. In an embodiment, multiple protocols utilize the same IP address and port number combination. For example, STUN messages may be sent to the same IP address and port number combination as an RTP IP flow and/or an RTCP IP flow. In the case of MPEG-2 TS RTP, no upstream messages are sent for the MAIN RTP IP flow but STUN messages are sent using the same server side IP address and port number combination as the RTP IP flow. For the MAIN RTCP IP flow, both RTCP messages and STUN messages are sent upstream to the same server side IP address and port number combination. The techniques described herein for managing media streaming between clients and servers are applicable to media sessions, media streams, and IP flows as described herein.

In the system 100 of FIG. 1, the stream servers 104 ingest digital video content and stream digital video content into the distribution network 106. In an embodiment, the stream servers are located in close physical proximity to each other, e.g., in the same Video Hub Office (VHO), and in other embodiments the stream servers are located in different VHOs.

The distribution network 106 between the stream servers 104 and the end-user locations 102 may be a cable-based network. Alternatively, other types of distribution networks may include, for example, digital subscriber line (DSL) networks, passive optical networks (PONs), and wireless access networks. The distribution network is a packet-based network and utilizes, for example, IP, Ethernet, ATM, or a combination thereof to communicate digital video content. In packet-based networks, digital video content is distributed via multicasting and unicasting. Multicasting typically involves replicating packets at nodes that include multiple branches leading to different clients. The replication of packets at branching nodes eliminates the need to send multiple packets of the same content over the same link. Unicasting typically involves point-to-point messaging between nodes (e.g., servers and clients). Point-to-point messaging can be accomplished, for example, using well-known source/destination address based protocols (e.g., IP or Ethernet). Typically, multicasting is not affected by NAT yet multicasting is mentioned to indicate that the distribution network can support both multicasting and unicasting.

The distribution network 106 supports the multicasting and unicasting of digital video content downstream from the stream servers 104 to the end-user devices. The distribution network also supports upstream unicast messaging from the end-user devices to the stream servers. The distribution network may utilize any network technology that supports multicasting and unicasting.

The end-user devices 110, 112, and 114 are systems that receive the digital video content from the distribution network and provide the digital video content to video display devices (e.g., televisions). The clients may be embodied as hardware, firmware, software, or any combination thereof. In the embodiment of FIG. 1, the STBs 112 receive digital video content from the stream servers 104 although it is possible that the other end-user devices may receive digital video content from the stream servers. The clients may also serve other functions such as establishing media sessions with the stream servers. In an embodiment, the clients manage the Network Layer (Layer 3) and Transport Layer (Layer 4) communications.

The NAT devices 108 remap the IP addresses of the end-user devices 110, 112, and 114, from IP addresses in a private address space to IP addresses in a public address space. In particular, for unicast communications in the upstream direction from the client side to the stream server side, the NAT devices map the IP addresses and port numbers of end-user devices to an IP address and port number of the NAT device. For a given IP flow, the IP address and port number of the NAT device are then used as the source IP address and port number in packets that travel upstream to the stream server side. For communications in the downstream direction from the stream server side to the client side, the IP address and port number of the NAT device are used as the destination IP address and destination port number and the NAT device translates the destination IP address and destination port number to an IP address and port number of the corresponding end-user device. In typical NAT operations, the source IP address and port number of all stream server originated packets stay unmodified in order to transit the NAT device. In the example of FIG. 1, IP flows of media sessions are identified by a combination of IP address and port number and the NAT devices map the combination of the IP address and the port number between the stream server side (i.e., the public IP address domain) and the client side (i.e., the private IP address domain). In an extreme form of NAT (e.g., symmetric NAT), the NAT device only passes inbound traffic (stream server to a client) from a specific external source IP address/port combination to a specific external destination IP address/port combination that has been previously detected by outbound messaging from an internal source IP address/port combination via, for example, STUN or another protocol. NAT devices by nature perform a filtering function. That is, NAT devices drop inbound packets that do not match the profile of known IP address/port number combinations, which are authorized by the NAT device, wherein the authorization is a function of inspection of outbound messages and a "n" period keepalive out-to-in mapping.

In the example of FIG. 1, a media session can be transmitted or "sourced" from any one of the stream servers 104 to any one of the end-user devices 110, 112, and 114. The existence of multiple stream servers provides flexibility in the sourcing of media sessions. In certain situations, it is desirable or necessary to switch the source of a media session from one stream server to a different stream server. Additionally, it is desirable to make the switch without any service disruption at the end-user device. However, in conventional streaming architectures, each stream server has a different IP address for media streaming and therefore a switch in the media session requires control plane signaling to learn IP address and port number combinations on both sides of the media session. For example, switching a media session from one stream server to another stream server requires explicit control plane signaling (e.g., RTSP and STUN signaling) in order to inform the client of the new IP address and port number combination of the media session and to cause the client to utilize signaling to open a path through the NAT device. While the control plane signaling required to switch one media session may not be an unbearable burden in a lightly loaded network, the migration of a large number of media sessions in a short period of time, as may be required in a failover situation, may take a significant period of time and may result in service disruptions.

To avoid triggering the control plane signaling (e.g., RTSP and STUN signaling) that is typically required to switch a media session from one stream server to a different stream server, a media session is switched from one stream server to a different stream server without changing the IP address and port number on the server side. In an embodiment, a media session is switched from one stream server to a different stream server without changing the IP address and port number on the server side of the media session by allowing the same stream server side IP address to be shared amongst multiple stream servers so that the stream servers can simultaneously use the same IP address to source different media sessions. Because the switching of a media session to a different stream server does not require a change in the stream server side IP address and port number, the switch does not trigger RTSP signaling, STUN signaling, or any change in the NAT mapping.

Because the same stream server side IP address is shared amongst multiple stream servers, upstream messages, which have the shared stream server side IP address as their destination IP address, may be routed to any one of the stream servers. Therefore, an upstream message related to a media session that is being sourced by one stream server may be routed to a different stream server in the stream server group instead of the sourcing stream server. If the receiving stream server does not recognize the media session because the stream server is not sourcing the media session, the message may be dropped and the intended purpose of the upstream message could go unfulfilled. Additionally, because of the dynamic nature of a routing network, the stream server that receives the upstream messages may change over time.

In order to ensure that upstream messages are able to fulfill their intended purpose, knowledge of the mapping of the established media sessions is aggregated so that the source stream server of each active media session within a stream server group is known. The aggregated knowledge is then used to ensure that the intended purpose of the upstream message is fulfilled. For example, the aggregated knowledge is used to ensure that an upstream message is provided to the corresponding stream server. In an embodiment, stream servers are configured to pre-process upstream messages to ensure that the intended purpose of the message is fulfilled. For example, the stream servers can be configured to act as a proxy to ensure that a received message is provided, either directly or indirectly, to the stream server that is sourcing the media session to which the message corresponds. In particular, the aggregated knowledge can be used to identify the stream server that is sourcing the media session to which the upstream message corresponds. Additionally, the stream servers can be configured to process messages, such as Real-time Control Protocol (RTCP) report messages, which correspond to media sessions that are sourced by other stream servers and forward the processed data to a separate logging server.

Figure 3A:
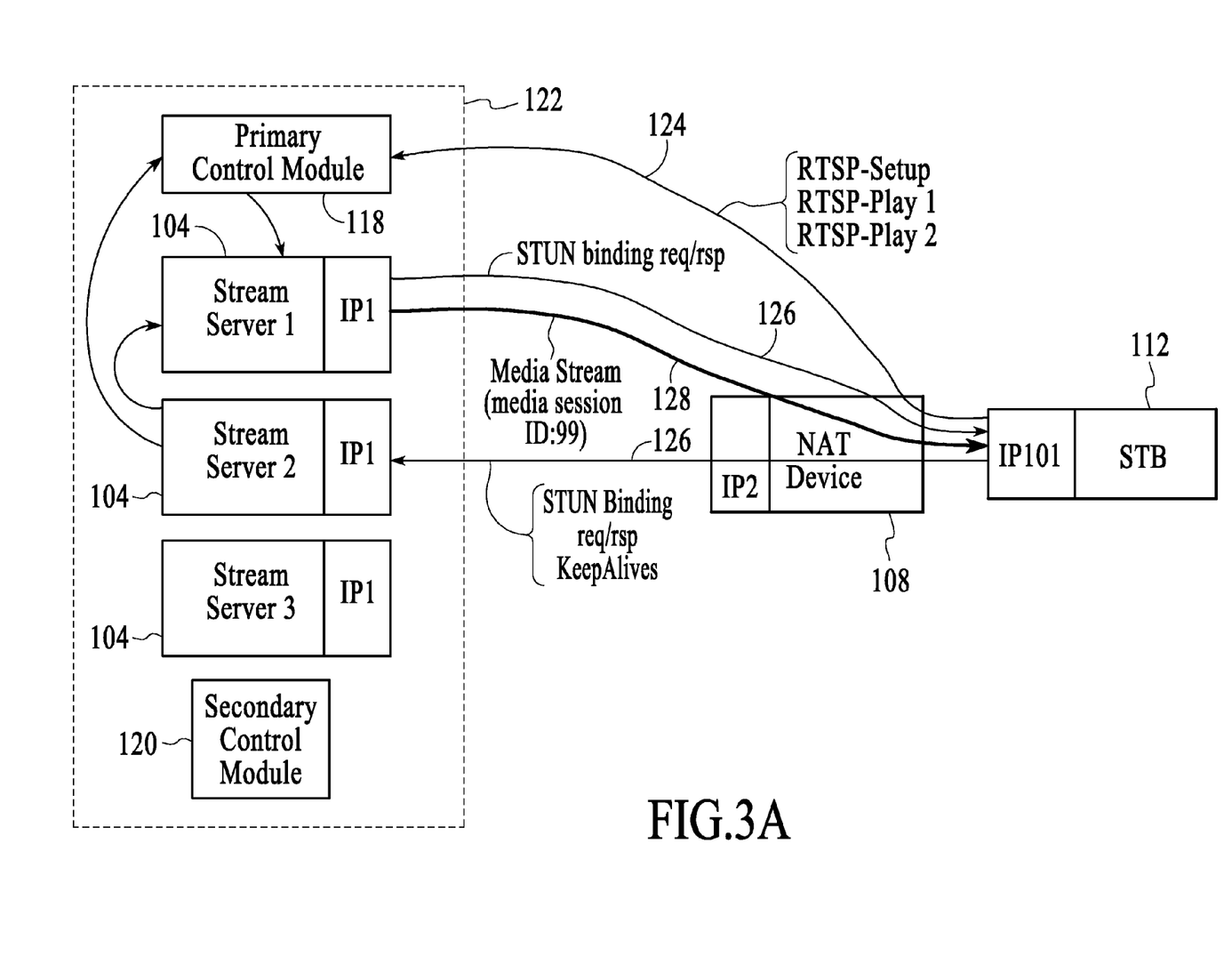
FIG. 3A illustrates messaging between stream servers, a primary control module, a NAT device, and a set-to-box (STB) and a media session between one of the stream servers and the STB.

FIG. 3A depicts three stream servers 104, a primary control module 118, a secondary control module 120, a NAT device 108, and a STB 112. The stream servers, NAT device, and STB are similar to those described with reference to FIG. 1 and are connected to each other through a distribution network (not shown in FIG. 3A). The stream servers are organized into a stream server group 122 that includes the three stream servers, the primary control module, and the secondary control module. The primary control module performs various control functions for the group and the secondary control module acts as a backup to the primary control module. In the embodiment of FIG. 3A, the primary control module provides centralized control functionality, yet in other embodiments, the control function could be distributed amongst the stream servers. In the embodiment of FIG. 3A, each of the stream servers shares the same IP address, IP1, the STB has IP address IP101, and the NAT device has IP address IP2. In the embodiment of FIG. 3A, the IP addresses of the stream servers and the NAT device, IP1 and IP2, are in a public IP address space and the IP address of the STB, IP101, is in a private IP address space. In an embodiment, each stream server can host more than one IP address. Additionally, some IP addresses may be shared amongst the stream servers while others are unique to particular stream servers.

FIG. 3A also illustrates messaging between the stream servers and the STB via the NAT device in the case of, for example, a single MPEG-2 TS IP flow over UDP. In the embodiment of FIG. 3A, STUN is used to support communications between the stream servers and the STB and RTSP is used to control the streaming of media from the stream servers to the STB. As is known in the field, client to server RTSP messages include DESCRIBE, SETUP, PLAY, PAUSE, RECORD, and TEARDOWN messages. FIG. 3A illustrates SETUP, PLAY 1, and PLAY 2 messages 124 being sent upstream from the STB to the primary control module. As part of the STUN signaling, STUN binding request and/or response (req/rsp) messages 126 are transmitted between the stream server group, the NAT device, and the STB. In particular, STUN binding req/rsp messages and keepalive are sent upstream from the client side to the server side and STUN binding req/rsp messages are sent downstream from the server side to the client side. As a result of the RTSP and STUN messaging, state information is established by the STB, the stream server, and the NAT device and a media session, which includes media stream 128, is established between one of the stream servers and the STB.

State information that is generated by the NAT device 108 includes a binding between a client IP address and port number and a stream server IP address and port number. For example, the NAT device maintains a table that associates private IP addresses and port numbers of the STB 112 to public IP addresses and port numbers of the NAT device. Bindings of public IP addresses and port numbers to the private IP addresses and port numbers are initiated by upstream traffic from the client side to the stream server side. Once the state information, i.e., a binding, is established, the NAT device translates the destination IP address and port number of downstream packets to the private IP address and port number of the STB and translates the source IP address and port number of upstream packets to the public IP address and port number of the NAT device.

Figure 4A:
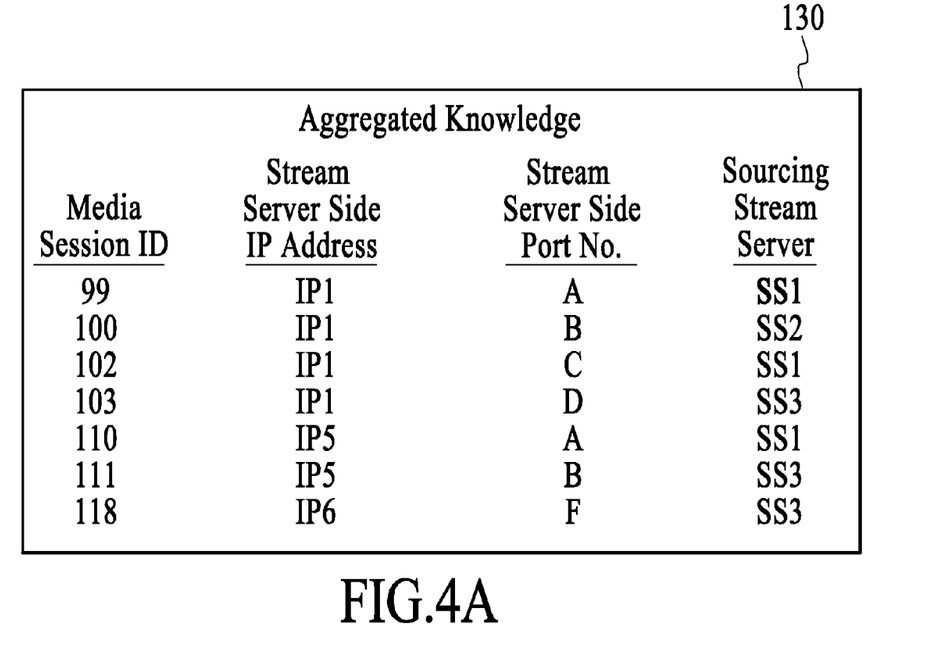
FIG. 4A depicts an example of a table of media session mappings that associates media session IDs, stream server side IP addresses, and stream server side port numbers with the stream servers that are sourcing the media sessions.

In an embodiment, establishing a media session (composed of a single media stream and a single IP flow) between a client and server involves mapping a stream server side IP address and a stream server side port number to a media session identifier (ID) and to a stream server. For example, a media session with stream server side IP address, IP1 and port number A is mapped to stream server 1. Additionally, knowledge of all of the media session mappings for the group 122 of stream servers is aggregated on the stream server side. For example, the knowledge of media session mappings is aggregated into a table 130 of media session mappings that identifies multiple media sessions that are sourced by the stream servers in the stream server group. FIG. 4A depicts an example of a table of media session mappings that associates media session IDs, stream server side IP addresses, and stream server side port numbers with the stream servers that are sourcing the media sessions. In the example of FIG. 4A, the media session mapping on the top row of the table corresponds to the media session illustrated in FIG. 3A. In particular, the top row of the table indicates that the IP flow of the media stream of media session ID 99 has a stream server side IP address of IP1, a stream server side port number of A, and is sourced by stream server 1, SS1.

The knowledge of media session mappings can be aggregated centrally, e.g., by the primary control module 118, or in a distributed manner by each stream server 104. Additionally, the aggregated knowledge can be centrally held, e.g., by the primary control module, or distributed to the stream servers in the group 122. Various different techniques can be used to aggregate the knowledge and to make the aggregated knowledge available for use. In the embodiment described with reference to FIGS. 3A and 4A, knowledge of the media session mappings is aggregated and held by the primary control module.

Once the NAT mappings are established (e.g., RTSP and STUN signaling is complete) and the media session is established, the media stream 128 can be streamed from one of the stream servers 104 to the STB 112 via the NAT device 108. While the media session is active, upstream messages 132 are sent from the client side to the server side. Because the same IP address is shared amongst all three of the stream servers, upstream messages may be routed (via IP routing) to any one of the stream servers. For example, in the embodiment of FIG. 3A, upstream messages are routed to stream server 2. Stream server 2 is configured to process the upstream messages to determine whether the upstream messages need to be processed at an entity that is different from the stream server. For example, an upstream message, or some portion thereof, may need to be processed by the primary control module 118, another stream server, or another entity such as a logging server. If necessary, upstream messages can be forwarded to the primary control module and/or directly to stream server 1 as illustrated in FIG. 3A. In an embodiment in which the aggregated knowledge is centrally stored, the stream server that receives the upstream messages forwards the upstream messages to the primary control module and the primary control module uses the aggregated knowledge to distribute the upstream messages, or some information related to the upstream messages, to the corresponding stream server. In an embodiment in which the aggregated knowledge is distributed to the stream servers, the stream server that receives an upstream message can use the aggregated knowledge to forward the upstream message, or some information related to the upstream message, directly to the appropriate stream server, e.g., the stream server that is sourcing the media session to which the upstream message corresponds.

Although some techniques for handling upstream messages are described, other techniques for handling upstream messages are possible as long as the purpose of the upstream message is fulfilled. For example, the purpose of the message can be fulfilled by providing the message itself to the corresponding stream server 104 or by providing some information, which is related to the message (e.g., an instruction, command, or data), to the stream server that is sourcing the media session, or locally processing the message such as seeing a keepalive message and dropping the keepalive message. Because the stream servers are each able to pre-process the upstream messages so that the intended purposes of the upstream messages are fulfilled, even if the receiving stream server is not the same stream server that is sourcing the media session, the stream server group acts a single IP host with respect to upstream messages.

Although some communications paths within the stream server group 122 are illustrated in FIG. 3A, other communications paths within the stream server group are possible. For example, the primary control module 118 may communicate with the secondary control module 120 and the stream servers 104 may communicate directly with each other.

Referring again to FIG. 3A, while the media session between stream server 1 104 and the STB 112 is active, it may be desirable or necessary to switch the media session to a different one of the stream servers in the stream server group 122. For example, it may be desirable to switch the media session to a different stream server for load balancing or switching to new content or it may be necessary to switch the media session to a different stream server because of a failure, e.g., a stream server failure, an interface failure, a link failure, etc. As described above, the media session illustrated in FIG. 3A can be switched from stream server 1 to a different stream server without changing the IP address and port number on the server side by allowing the stream server side IP address, IP1, to be shared amongst all of the stream servers in the group so that the stream servers in the group can simultaneously use IP1 to source different media sessions. Because the stream servers can simultaneously use IP1 to source different media sessions, media session 99 can be switched to a different stream server without changing the stream server side IP address and port number of the IP flow.

Figure 3B:
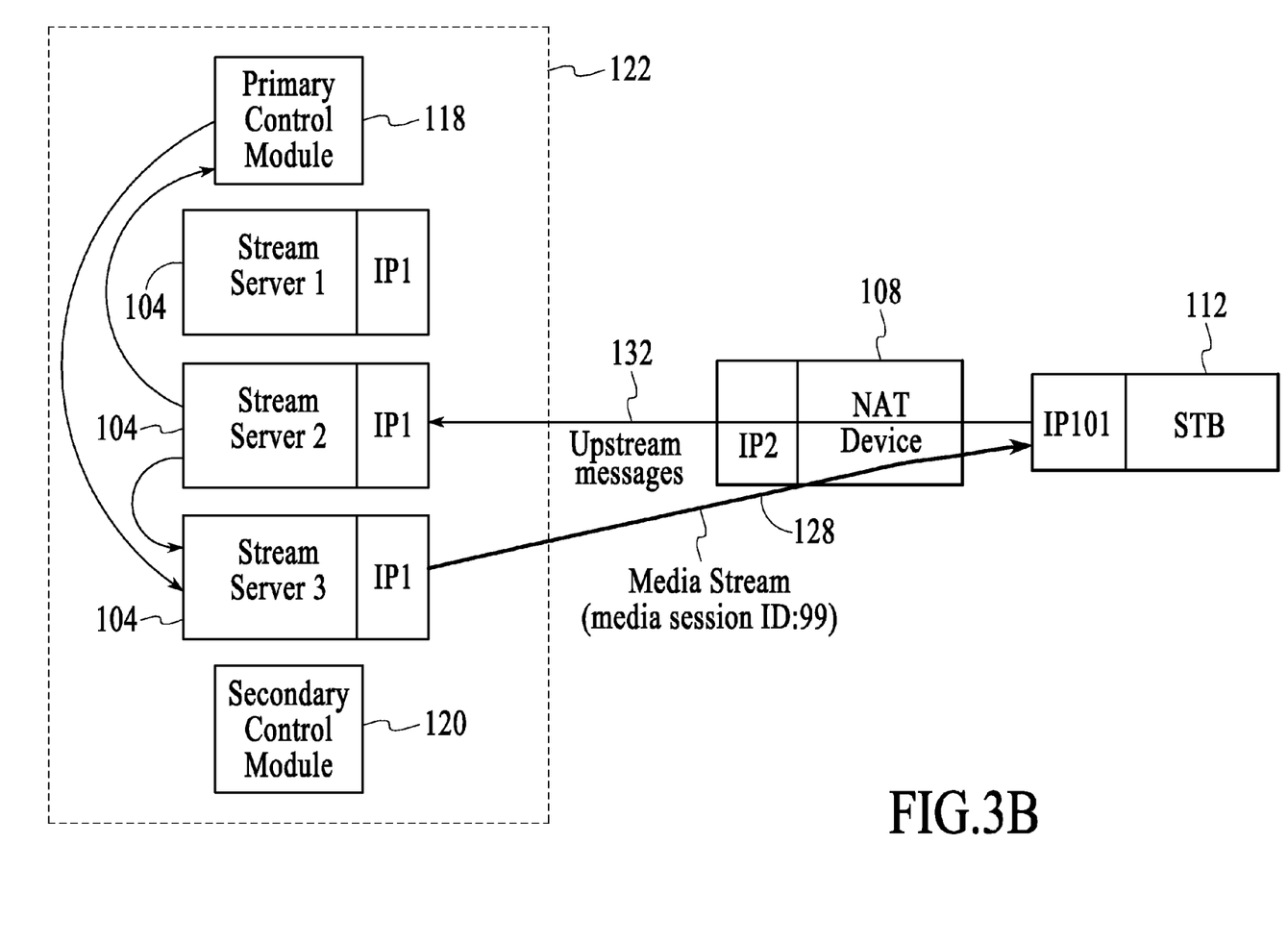
FIG. 3B illustrates the same media session as in FIG. 3A after the media session has been switched to a different stream server.
Figure 4B:
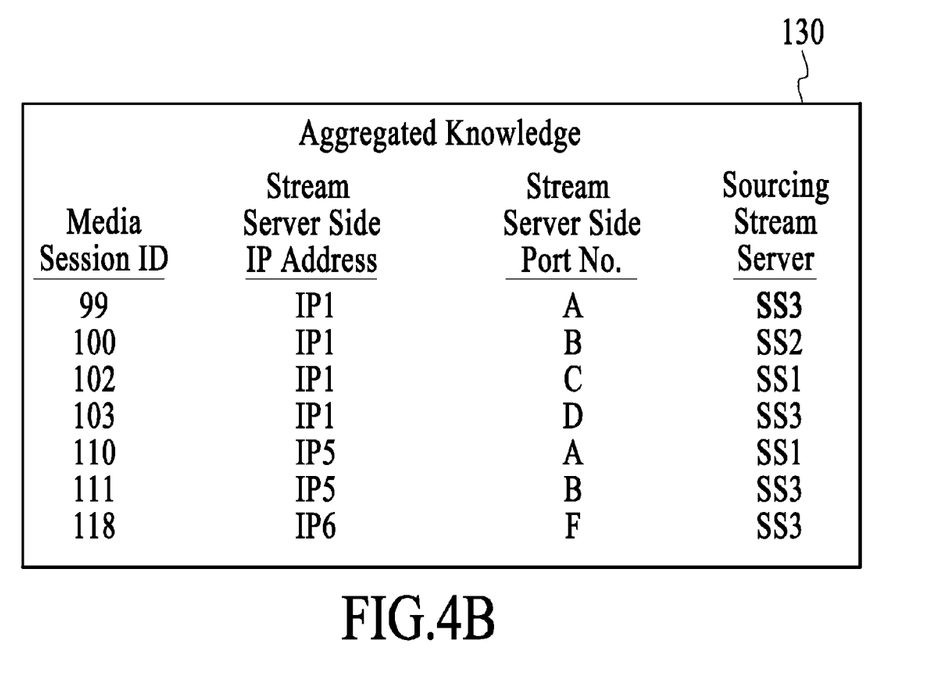
FIG. 4B illustrates the table of FIG. 4A after a media session has been switched to a different stream server.

FIG. 3B illustrates the same media session, which includes media stream 128, as in FIG. 3A after the media session has been switched from being sourced by stream server 1 104 to being sourced by stream server 3. As illustrated in FIG. 3B, no additional RTSP or STUN binding req/rsp signaling is required to complete the switch. Once the media session is switched to stream server 3, the table of media session mappings must be updated to reflect the change. FIG. 4B illustrates the table 130 of FIG. 4A after the media session has been switched from being sourced by stream server 1 to being sourced by stream server 3. As indicated in FIG. 4B, the IP flow of the media stream of media session 99 still has the same stream server side IP address, IP1, and port number, A, but the stream server has changed from stream server 1, SS1, to stream server 3, SS3.

Although the media session is now being sourced by stream server 3, upstream messages 132 that correspond to the media session are still being received by stream server 2

104. As was the case when the media session was being sourced by stream server 1, stream server 2 pre-processes the upstream messages and ensures that the purpose of the upstream messages is fulfilled. For example, stream server 2 may forward the upstream message to the primary control module 118, forward the upstream message directly to stream server 3, process the message locally, and/or forward the message to another entity such as a logging server. If the upstream message is forwarded to the primary control module, the primary control module uses the aggregated knowledge to determine which stream server is sourcing the media session to which the upstream message corresponds. If the receiving stream server is responsible for forwarding the message directly to the corresponding stream server, then the receiving stream server uses a local version of the aggregated knowledge to make the forwarding decision.

As an example, upstream messages 132 may include STUN keepalives, RTCP reports, and RTCP NACKs. In an embodiment, STUN keepalive messages are tracked by the receiving stream server, RTCP reports are logged, but they could trigger the forwarding of a flag to the sourcing stream server to indicate the quality of the stream, and RTCP NACKS are forwarded to the sourcing stream server if capacity is available or they may be dropped if capacity is not available.

In addition to using the aggregated knowledge for managing upstream messages, the aggregated knowledge can be used to ensure that the same stream server side IP address and port number combination are not used to source two different media sessions.

In an embodiment, the example described above with reference to FIGS. 3A and 3B applies to the use of a single MPEG-2 TS IP flow over UDP. In another embodiment, MPEG-TS RTP is used instead of MPEG-TS UDP to stream digital video content to the end-user locations. One feature of RTP is RTCP messages, which are used to communicate out of band control information for an RTP media stream. For example, RTCP messages are used to provide feedback to the stream server on the quality of service that is being provided by the RTP media stream via a second IP flow. The RTCP messages include statistics about the media connection such as bytes sent, packets sent, lost packets, jitter, and round trip delay. RTCP is also used to generate negative acknowledgements (NAKS) so that the stream server can generate repair packets via, for example, the REPAIR RTP IP flow.

While it is possible to process upstream RTCP messages as described above, wherein the upstream RTCP messages have the shared stream server side IP address, $IP_1$, as their destination IP address and the receiving stream server 104 pre-processes the received messages to ensure that the purpose of the message is fulfilled, in an alternative embodiment, upstream RTCP messages are sent directly to the sourcing stream server using a feedback IP address that is unique to the sourcing stream server. In an embodiment, a stream server that is sourcing a media session embeds a feedback IP address, which is specific to the stream server, into an RTCP message that is sent downstream to the STB 112. The STB extracts the feedback IP address from the RTCP message and uses the feedback IP address as the destination IP address for subsequent RTCP messages that are sent upstream from the STB to the stream server. Because the destination IP address is unique to the stream server that is sourcing the media session, the upstream RTCP packets are routed directly to the corresponding stream server. If the media session is switched to a new stream server, the IP address and port numbers on the server side of the MAIN and REPAIR IP flows of the media session do not have to change, as described above, but a new feedback IP address, which is specific to the new sourcing stream server, is embedded into at least one downstream RTCP message. The STB extracts the new feedback IP address and uses the new feedback IP address as the destination IP address for subsequent upstream RTCP messages so that the upstream RTCP messages are routed directly to the new sourcing stream server. In an embodiment, the feedback IP address is embedded into the payload portion of a downstream message, for example, the payload portion of an RTCP message that is sent from the sourcing stream server to the STB.

Figure 5A:
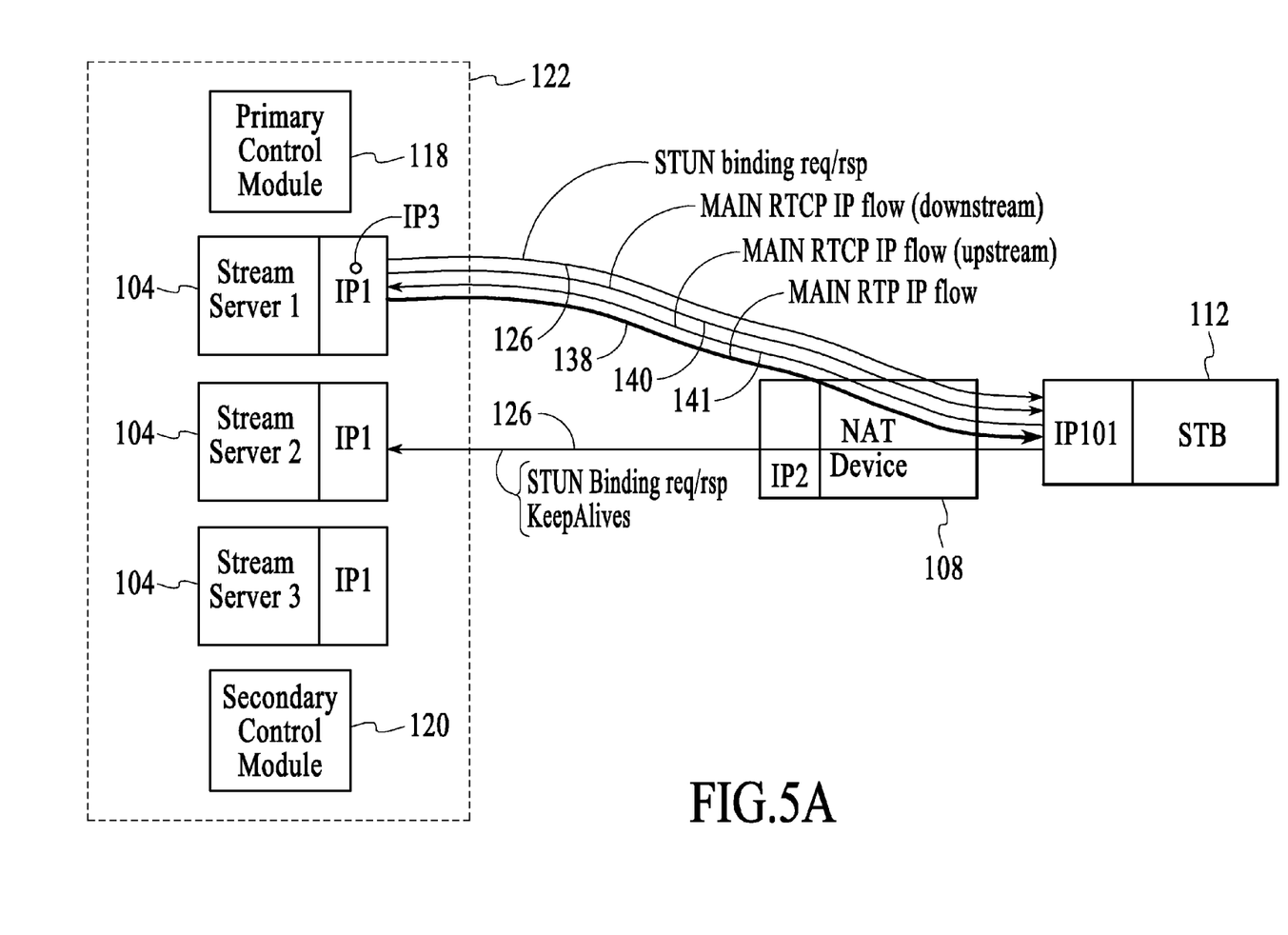
FIG. 5A illustrates messaging between stream servers and a STB via a NAT device in a system that uses MPEG-TS RTP to stream digital video content to the STB.

FIG. 5A illustrates a media session that uses MPEG-TS RTP to stream digital video content to the STB. The media session includes a MAIN RTP IP flow 138 and a bidirectional MAIN RTCP IP flow, downstream 140 and upstream 141. As illustrated in FIG. 5A, STUN binding req/rsp messages 126 are exchanged between the stream server side and the client side to establish the NAT mapping and the media session. Once the NAT mapping and media session are established and active, the bidirectional MAIN RTCP IP flow 140 and 141 (e.g., RTCP reports, NAKs, keepalives) flows between the stream server side and the client side. Additionally, as described above, stream server 1 embeds a feedback IP address, e.g., IP3, which is specific to stream server 1, into at least one RTCP message that is sent downstream (MAIN RTCP IP flow 140) to the STB. The STB extracts the feedback IP address from the RTCP message and uses the feedback IP address as the destination IP address for subsequent RTCP messages that are sent upstream (MAIN RTCP IP flow 141) from the STB. Because the destination IP address, IP3, is unique to stream server 1, the upstream RTCP packets are routed directly to stream server 1.

Figure 5B:
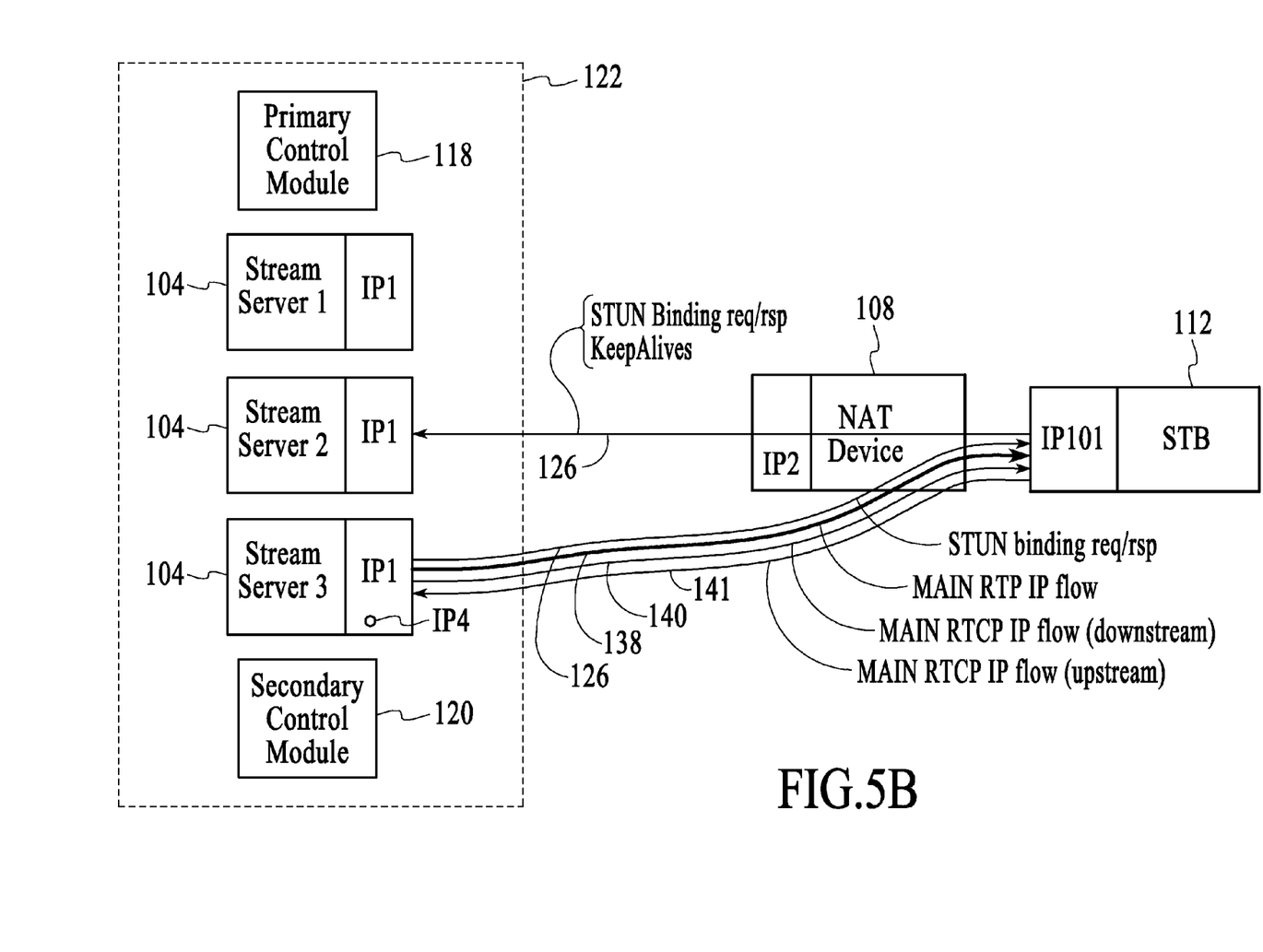
FIG. 5B illustrates the messaging between the stream servers and the STB of FIG. 5A after the media session has been switched to a different stream server.

If the media session is switched to a new stream server 104, the IP address and port numbers on the server side of the MAIN RTP and REPAIR RTP IP flows of the media session do not have to change, as described above, but a new feedback IP address, which is specific to the new sourcing stream server, is embedded into downstream RTCP messages (MAIN RTCP IP flow 140). The new feedback IP address is used as the destination IP address for subsequent upstream RTCP messages (MAIN RTCP IP flow 141). FIG. 5B illustrates the messaging between the stream servers and the STB 112 after the media session has been switched from stream server 1 to stream server 3. As described above with reference to FIG. 5A, stream server 3 embeds a feedback IP address, $IP_4$, which is specific to stream server 3, into at least one RTCP message that is sent downstream to the STB (MAIN RTCP IP flow 140). The STB extracts the new feedback IP address from the RTCP message and uses the feedback IP address as the destination IP address for subsequent RTCP messages that are sent upstream from the STB (MAIN RTCP IP flow 141). Because the destination IP address, IP4, is unique to stream server 3, the upstream RTCP packets are routed directly to stream server 3. STUN signaling also occurs for the RTCP IP flows used for feedback signaling.

It should be noted that MPEG-TS UDP and MPEG-TS RTP can be used simultaneously in the same stream server. However, the technique of using a feedback address to direct upstream messages is applicable specifically to MPEG-TS RTP. Also, the example described with reference to FIGS. 3A and 3B is applicable to implementations that use MPEG TS RTP. For example, when a different stream server is selected to source a media session, all four IP flows (MAIN RTP, MAIN RTCP, REPAIR RTP, and REPAIR RTCP) are signaled via STUN and all operations on the stream servers occur as described in the single IP flow case of FIGS. 3A and 3B.

In the embodiments described with reference to FIGS. 3A-4B, the stream servers are centrally controlled by the primary control module. In alternative embodiments, control functionality can be distributed, either entirely or partially, amongst the stream servers. Additionally, the control module can be located external to the stream servers (as shown in FIGS. 3A-4B) or internal to one or more of the stream servers.

Network address translation that requires the same fixed server side and client side IP address and port combinations is referred to as symmetric NAT although the above-described techniques are applicable to other types of NAT and even to media sessions with no NAT device on path. The above-described techniques are especially applicable to symmetric NAT.

Figure 6:
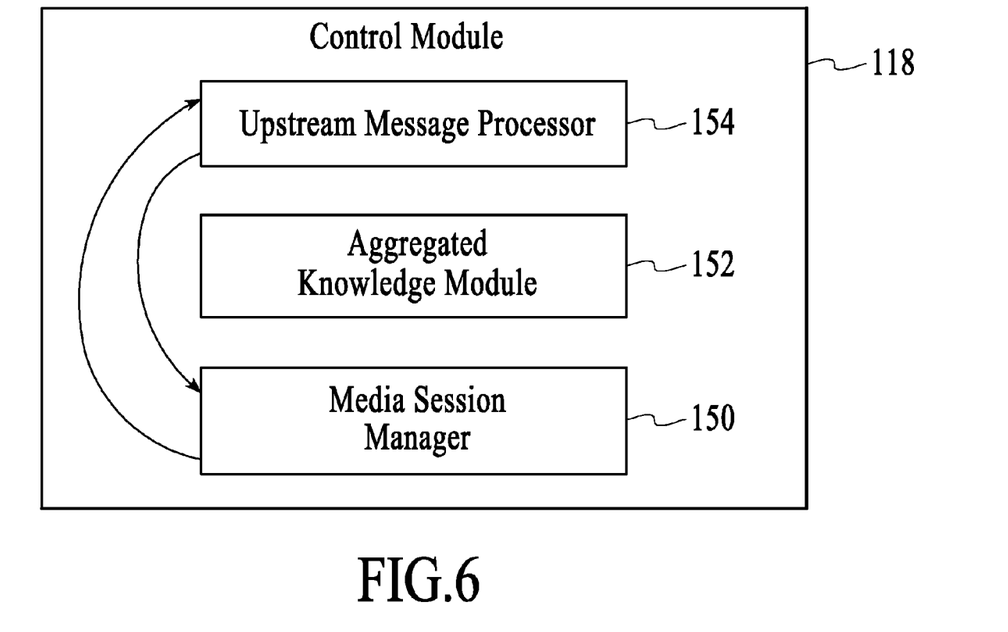
FIG. 6 depicts an embodiment of a control module as depicted in FIGS. 3A, 3B, 5A, and 5B.

FIG. 6 depicts an embodiment of a control module 118 as depicted in FIGS. 3A, 3B, 5A, and 5B. In the embodiment of FIG. 6, the control module includes a media session manager 150, an aggregated knowledge module 152, and an upstream message processor 154. The media session manager manages the set-up, tear-down, and switching of media sessions. The aggregated knowledge module manages the aggregation of media session mappings within a stream server group. Additionally, the aggregated knowledge manager stores the aggregated knowledge that can be used when processing upstream messages and when establishing and/or switching streams sessions. The upstream message processor processes upstream messages, or information related to the upstream messages. In an embodiment, the upstream message processor uses aggregated knowledge stored in the aggregated knowledge module to ensure that upstream messages, or information related to upstream messages, are provided to the proper stream servers, e.g., the stream server that is sourcing the IP flow(s) of the media stream(s) of the media session to which the upstream message corresponds. The media session manager, the aggregated knowledge module, and the upstream message processor can be embodied in software, hardware, firmware, or a combination thereof.

Figure 7:
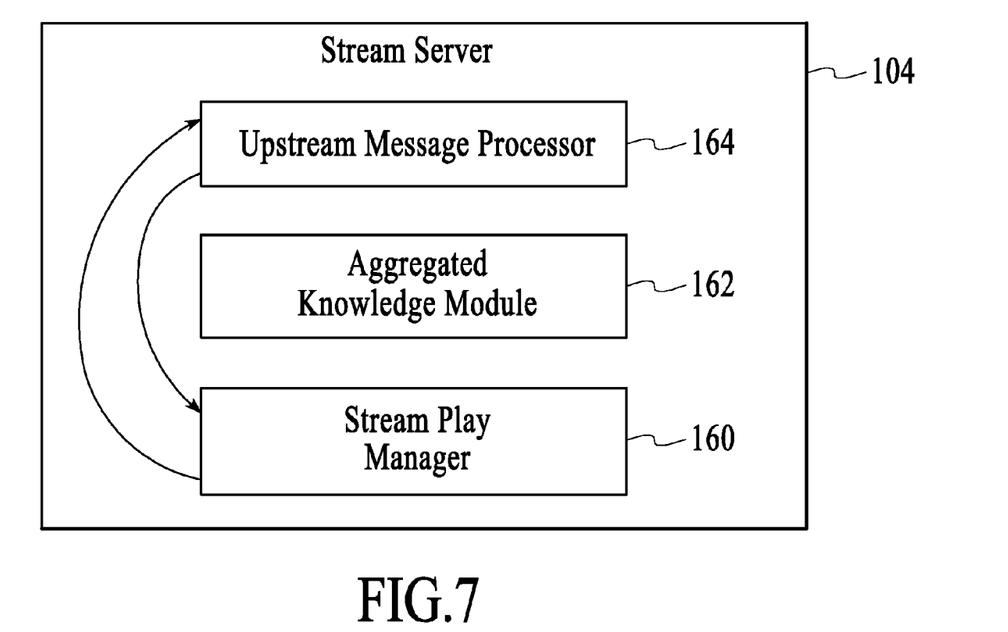
FIG. 7 depicts an embodiment of a stream server as depicted in FIGS. 3A, 3B, 5A, and 5B.

FIG. 7 depicts an embodiment of a stream server 104 as depicted in FIGS. 3A, 3B, 5A, and 5B. In the embodiment of FIG. 7, the stream server includes a stream play manager 160, an aggregated knowledge module 162, and an upstream message processor 164. The stream play manager manages the play-out and switching of media sessions. The aggregated knowledge module manages the aggregation of media session mappings within a stream server group. Additionally, the aggregated knowledge module stores the aggregated knowledge that can be used when processing upstream messages and when establishing and/or switching streams sessions. The upstream message processor processes upstream messages, or information related to the upstream messages. In an embodiment, the upstream message processor uses aggregated knowledge stored in the aggregated knowledge module to ensure that upstream messages, or information related to upstream messages, are provided to the proper stream servers, e.g., the stream server that is sourcing the media session to which the upstream message corresponds. In an alternative embodiment, the upstream message processor identifies whether or not the stream server is sourcing a media session related to the upstream message and forwards, to the control module, messages that are related to media sessions that the server is not sourcing. The stream play manager, the aggregated knowledge module, and the upstream message processor can be embodied in software, hardware, firmware, or a combination thereof.

The exact functions of the control module and the stream servers will vary depending on the how the responsibilities are distributed within the group of stream servers. Examples of different functional distributions are described above.

Figure 8:
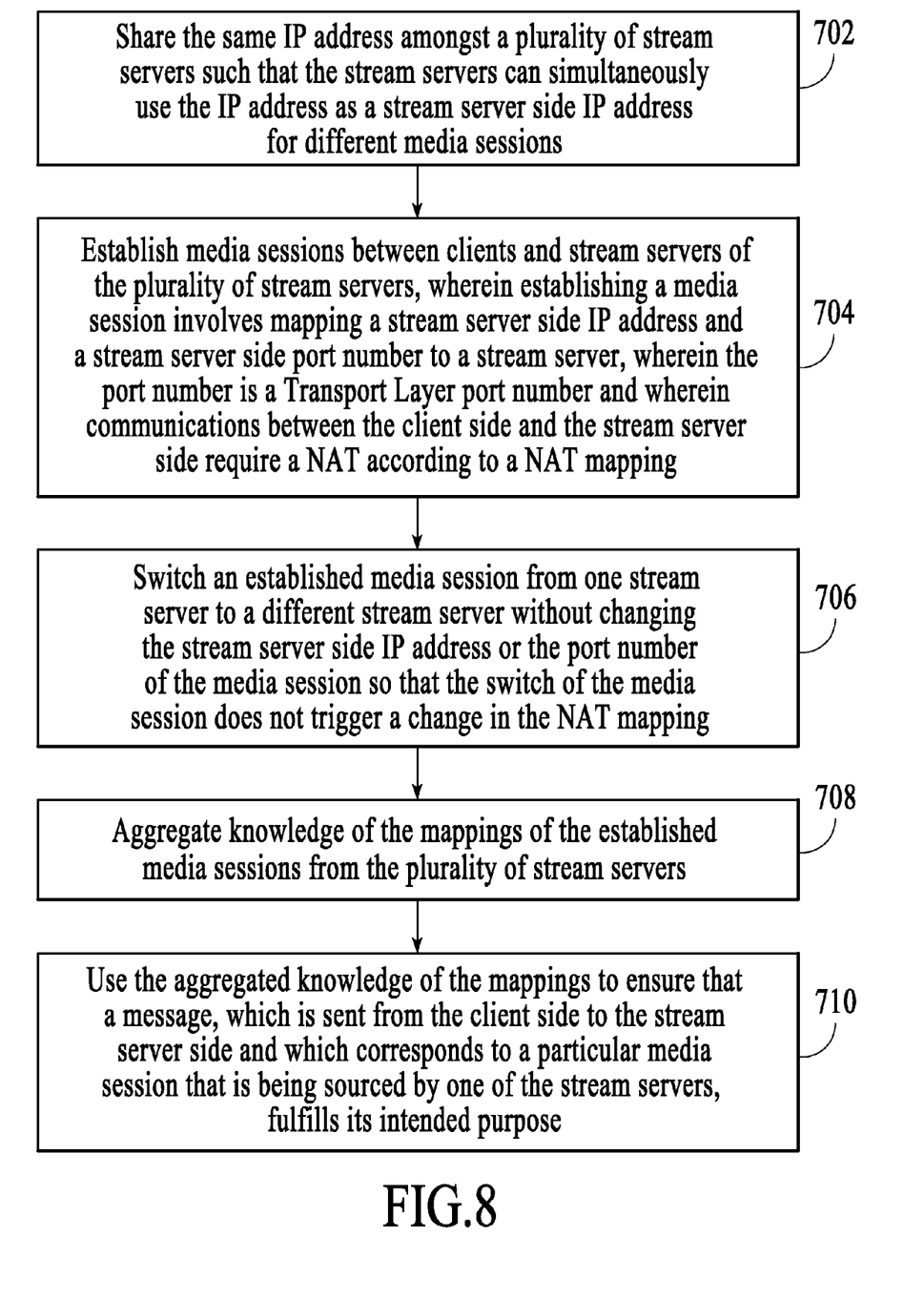
FIG. 8 is a process flow diagram of a method for managing media streaming between clients on a client side of a network and stream servers on a stream server side of the network, wherein communications between the client side and the stream server side require a NAT.

FIG. 8 is a process flow diagram of a method for managing media streaming between clients on a client side of a network and stream servers on a stream server side of the network, wherein communications between the client side and the stream server side require NAT traversal. At block 702, the same IP address is shared amongst a plurality of stream servers such that the stream servers can simultaneously use the IP address as a stream server side IP address for different media sessions. At block 704, media sessions are established between clients and stream servers of the plurality of stream servers, wherein establishing a media session involves mapping a stream server side IP address and a stream server side port number to a stream server, wherein the port number is a Transport Layer port number and wherein communications between the client side and the stream server side require a NAT according to a NAT mapping. At block 706, an established media session is switched from one stream server to a different stream server without changing the stream server side IP address or the stream server side port number of the media session so that the switch of the media session does not trigger a change in the NAT mapping.

In an additional step of the method, at block 708, knowledge of the mappings of the established media sessions from the plurality of stream servers is aggregated. At block 710, the aggregated knowledge of the mappings is used to ensure that a message, which is sent from the client side to the stream server side and which corresponds to a particular media session that is being sourced by one of the stream servers, fulfills its intended purpose.

At least some of the operations above-described techniques may be implemented using software instructions stored on a computer useable storage medium for execution by a computer. As an example, an embodiment of a computer program product includes logic encoded in one or more tangible media for execution and when executed, causes the computer to perform operations, as described above.

Embodiments of the above-described technique can take the form of an entirely hardware embodiment, an entirely software embodiment, or an embodiment containing both hardware and software elements. In one embodiment, the above-described technique is implemented in software, which includes but is not limited to firmware, resident software, microcode, etc.

Furthermore, embodiments of the above-described technique can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Although specific embodiments of the invention have been described and illustrated, the invention is not to be limited to the specific forms or arrangements of parts as described and illustrated herein. The invention is limited only by the claims.

What is claimed is:

1. A method for managing media streaming between clients on a client side of a network and stream servers on a stream server side of the network, wherein communications between the client side and the stream server side require a network address translation (NAT), the method comprising:
   sharing the same Internet Protocol (IP) address amongst a plurality of stream servers such that the stream servers can simultaneously use the IP address as a stream server side IP address for different media sessions;
   establishing media sessions between clients and stream servers of the plurality of stream servers, wherein establishing a media session involves mapping a stream server side IP address and a stream server side port number to a stream server, wherein the port number is a Transport Layer port number and wherein communications between the client side and the stream server side require a NAT according to a NAT mapping;
   switching an established media session from one stream server to a different stream server without changing the stream server side IP address or the stream server side port number of the media session so that the switch of the media session does not trigger a change in the NAT mapping;
   the method further comprising:
   on the stream server side, embedding a feedback IP address into a payload portion of an RTCP message, wherein the feedback IP address is unique to the stream server that is sourcing a media session and is embedded by the stream server that is sourcing the media session, and transmitting the RTCP message to a client from the stream server that is sourcing the media session;
   on the stream server side, receiving an RTCP message from the client, which is related to the media session, wherein the feedback IP address is used as the destination IP address of the received RTCP message;
   embedding a different feedback IP address into a payload portion of an RTCP message after the media session is switched from one stream server to a different stream server, wherein the different feedback IP address is unique to the different steam server and is embedded by the stream server that is sourcing the media session, and transmitting the RTCP message to the client from the stream server that is sourcing the media session; and
   on the stream server side, receiving another RTCP message from the client, which is related to the media session, wherein the different feedback IP address is used as the destination IP address of the received RTCP message.

2. The method of claim 1 further comprising:
   aggregating knowledge of the mappings of the established media sessions from the plurality of stream servers; and
   using the aggregated knowledge of the mappings to ensure that a message, which is sent from the client side to the stream server side and which corresponds to a particular media session that is being sourced by one of the stream servers, fulfills its intended purpose.

3. The method of claim 1 further comprising:
   receiving an upstream message that corresponds to a particular media session that is being sourced by one of the stream servers;
   at the stream server that receives the upstream message, determining whether the upstream message needs to be processed at an entity that is remote from the stream server; and
   transmitting the message to another entity if it is determined that the message needs to be remotely processed.

4. The method of claim 3 wherein the upstream message is transmitted to a control module.

5. The method of claim 3 wherein information related to the upstream message is transmitted to the stream server that is sourcing the media session to which the upstream message corresponds.

6. The method of claim 3 wherein the upstream message comprises an RTCP report message, the method further comprising, at the stream server that received the upstream message, processing the RTCP report message and forwarding processed information related to the RTCP report message to an entity other than one of the plurality of stream servers.

7. The method of claim 6 wherein the entity is a logging server.

8. The method of claim 1 further comprising:
   at a stream server, receiving an upstream message that corresponds to a particular media session that is being sourced by one of the stream servers, wherein the stream server that received the upstream message is not the stream server that is sourcing the media session;
   transmitting a message, from the stream server that received the upstream message, in response to the upstream message; and
   triggering, in response to the transmitted message, an operation at the stream server that is sourcing the media session.

9. The method of claim 1 wherein NAT comprises symmetric NAT.

10. A system for managing media streaming between clients on a client side of a network and stream servers on a stream server side of the network, wherein communications between the client side and the stream server side require a network address translation (NAT), the system comprising:
    a processor; and
    non-transitory memory coupled to the processor and storing program code, which when executed by the processor implements a control module configured to:
    establish media sessions between clients and stream servers of a plurality of stream servers, wherein established media sessions include a stream server side Internet Protocol (IP) address and a stream server side port number mapped to a stream server, wherein the port number is a Transport Layer port number and wherein communications between the client side and the stream server side require a NAT according to a NAT mapping and wherein the same IP address is shared amongst the plurality of stream servers such that the stream servers can simultaneously use the IP address as a stream server side IP address for different media sessions; and
    switch an established media session from one stream server to a different stream server without changing the stream server side IP address or the stream server side port number of the media session so that the switch of the media session does not trigger a change in the NAT mapping;

wherein the stream servers are configured to:
embed a feedback IP address into a payload portion of a downstream RTCP message, wherein the feedback IP address is unique to the stream server that is sourcing a media session and is embedded by the stream server that is sourcing the media session, wherein the feedback IP address is used on the client side as the destination IP address for RTCP messages; and embed a different feedback IP address into the payload portion of a downstream RTCP message after an established media session is switched from one stream server to a different stream server, wherein the different feedback IP address is unique to the different steam server and is embedded by the stream server that is sourcing the media session.

11. The system of claim 10 wherein the control module is further configured to:

aggregate knowledge of the mappings of the established media sessions from the plurality of stream servers; and use the aggregated knowledge of the mappings to ensure that a message, which is sent from the client side to the stream server side and which corresponds to a particular media session that is being sourced by one of the stream servers, fulfills its intended purpose.

12. The system of claim 10 further comprising a table of aggregated knowledge of the mappings of the established media sessions from the plurality of stream servers.

13. The system of claim 12 wherein the table is stored at the stream servers.

14. The system of claim 10 wherein the stream servers are configured to:

receive an upstream message that corresponds to a particular media session that is being sourced by one of the stream servers;

at the stream server that receives the upstream message, determine whether the upstream message needs to be processed at an entity that is remote from the stream server; and transmit the message to another entity if it is determined that the message needs to be remotely processed.

15. The system of claim 14 wherein the upstream message is transmitted to a control server.

16. The system of claim 14 wherein the upstream message is transmitted to the stream server that is sourcing the media session to which the upstream message corresponds.

17. A method for managing media streaming between clients on a client side of a network and stream servers on a stream server side of the network, wherein communications between the client side and the stream server side require a network address translation (NAT), the method comprising:

sharing the same Internet Protocol (IP) address amongst a plurality of stream servers such that the stream servers can simultaneously use the IP address as a stream server side IP address for different media sessions;

establishing media sessions between clients and stream servers of the plurality of stream servers, wherein establishing a media session involves mapping a stream server side IP address and a stream server side port number to a stream server, wherein the port number is a Transport Layer port number and wherein communications between the client side and the stream server side require a NAT according to a NAT mapping;

switching an established media session from one stream server to a different stream server without changing the stream server side IP address or the stream server side port number of the media session so that the switch of the media session does not trigger a change in the NAT mapping;

the method further comprising:

receiving an upstream message that corresponds to a particular media session that is being sourced by one of the stream servers;

at the stream server that receives the upstream message, determining whether the upstream message needs to be processed at an entity that is remote from the stream server; and transmitting the message to another entity if it is determined that the message needs to be remotely processed;

wherein the upstream message comprises an RTCP report message, the method further comprising, at the stream server that received the upstream message, processing the RTCP report message and forwarding processed information related to the RTCP report message to an entity other than one of the plurality of stream servers, wherein the entity is a logging server.

18. The method of claim 17 further comprising:

aggregating knowledge of the mappings of the established media sessions from the plurality of stream servers; and using the aggregated knowledge of the mappings to ensure that a message, which is sent from the client side to the stream server side and which corresponds to a particular media session that is being sourced by one of the stream servers, fulfills its intended purpose.

19. The method of claim 17 further comprising:

on the stream server side, embedding a feedback IP address into a payload portion of an RTCP message, wherein the feedback IP address is unique to the stream server that is sourcing a media session, and transmitting the RTCP message to a client from the stream server that is sourcing the media session;

on the stream server side, receiving an RTCP message from the client, which is related to the media session, wherein the feedback IP address is used as the destination IP address of the received RTCP message;

embedding a different feedback IP address into a payload portion of an RTCP message after the media session is switched from one stream server to a different stream server, wherein the different feedback IP address is unique to the different steam server, and transmitting the RTCP message to the client from the stream server that is sourcing the media session; and on the stream server side, receiving another RTCP message from the client, which is related to the media session, wherein the different feedback IP address is used as the destination IP address of the received RTCP message.

* * * * *